HALF WAVE PHOTO MODULATOR

Filed Oct. 29, 1965

INVENTOR
CHARLES GUNN-RUSSELL
BY Albert P. Davis
Burnett W. Norton
ATTORNEYS

May 27, 1969 C. GUNN-RUSSELL 3,447,101

HALF WAVE PHOTO MODULATOR

Filed Oct. 29, 1965 Sheet 2 of 2

United States Patent Office 3,447,101
Patented May 27, 1969

3,447,101
HALF WAVE PHOTO MODULATOR

Charles Gunn-Russell, London, England, assignor to Leesona Corporation, Warwick, R.I., a corporation of Massachusetts Filed Oct. 29, 1965, Ser. No. 505,681
Claims priority, application Great Britain, Oct. 29, 1964, 44,208/64
Int. Cl. H03c 1/14
U.S. Cl. 332—3 3 Claims

ABSTRACT OF THE DISCLOSURE

A modulated output signal is obtained from a photo transducer by biasing it with a rectified half wave carrier signal to produce pulsed output signals modulated as a function of light on the transducer. A small mark to space ratio using rounded pulses is found advantageous in photo transducer operation. A photo diode is coupled in opposition with a low capacitiy diode to improve output signal characteristics.

Figure 1:
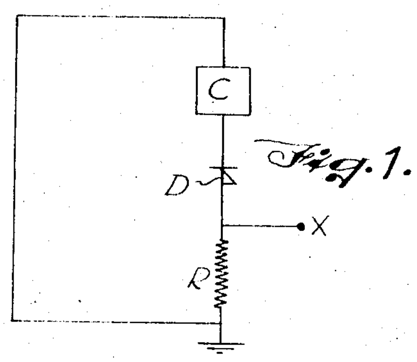

In some applications of optical-electric transducers for producing an electrical waveform from an optical signal responsive to a parameter of interest, it is advantageous to arrange that the electrical waveform corresponds, not with the parameter itself, but rather with a carrier signal modulated with a signal corresponding with the parameter. This is especially so when the changes in the parameter concerned have components of such low frequency that amplification of an electrical waveform corresponding with the parameter itself would necessitate the use of a DC amplifier. A carrier signal modulated as aforesaid may be obtained by driving the lamp or other source of illumination at the carrier frequency as described in the provisional specifications of my co-pending patent applications 113,316/64, 24,992/64 and 42,343/64 where the parameter concerned is the thickness of a yarn passed between the source of illumination and the transducer in a yarn-scanning head. The technique is, however, objectionable in that the source of illumination employed must be chosen for its ability to flash at the carrier frequency and must be driven by a circuit capable of providing the necessary power at the carrier frequency.

In accordance with the present invention there is provided an apparatus for producing a carrier modulated by an optical input to the apparatus, which comprises an optical-electric transducer of the kind responsive to incident illumination to produce an output which is a function of the incident illumination when the transducer is biased with a bias voltage, and a bias circuit arranged to bias the transducer with a carrier waveform. By the expression "optical-electric transducer" as used herein is meant any device operable to give an electrical output in response to an optical input.

The bias circuit may simply be one providing halfwave rectified AC of appropriate frequency or a square wave generator. However, with a transducer in the form of a phototransistor or a photodiode of the semi-conductor type, which is a very convenient form of transducer for many applications, it is found that the output signal for a square wave bias tends to have a poor waveform, showing high peaks on the leading edges. The waveform difficulty is avoidable, it is found, by giving the modulated waveform a pulsed configuration with a small mark to space ratio, e.g. pulses of about 3 micro-seconds duration. A typical recurrence frequency is 30 kcs. Moreover, the pulse output obtainable is substantially greater than the output obtainable with square waves; it can indeed be ten times as great.

In order to avoid driving difficulties, the bias pulses should preferably be free from sharp leading edges. Pulses obtained in the bias circuit by clipping a sine wave to leave peaks which are then amplified as eminently satisfactory.

Figure 2:
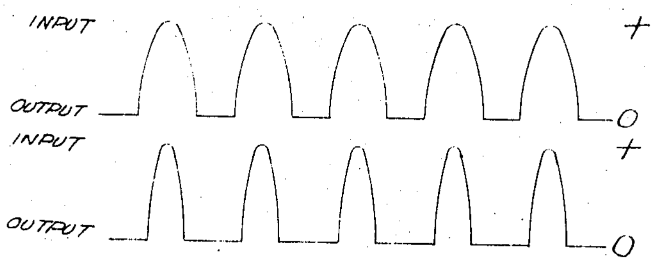
Figure 3:
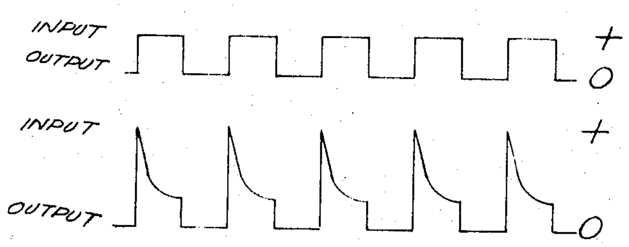
Figure 4:
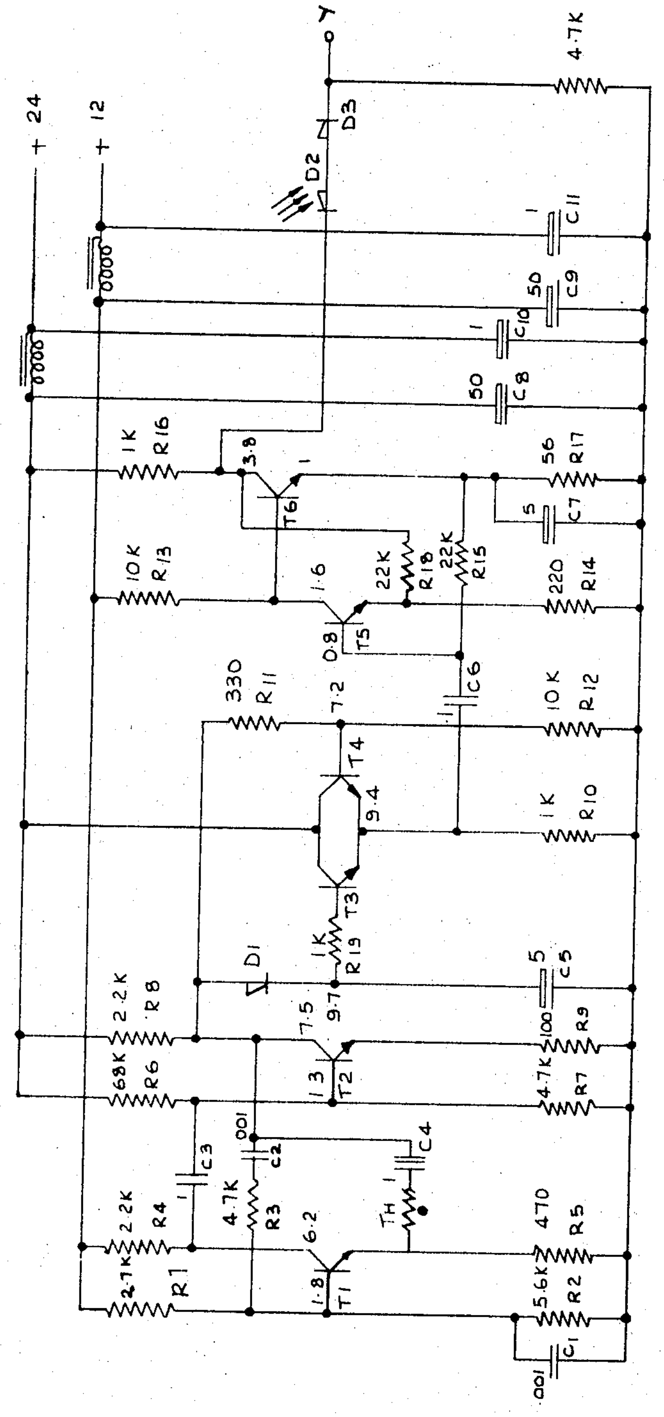

The following description in which reference is made to the accompanying drawings, is given in order to illustrate the invention. In the drawings:

FIGS. 1 to 3 are diagrammatic drawings showing the general form of the apparatus and input and output waveforms thereof, and FIG. 4 shows in detail a practical embodiment of the apparatus.

In FIG. 1 of the drawings, there is shown a photodiode D in series with a bias circuit C and a loading resistor R, typically a 1K, resistor. The output waveform obtained at X for a constant level of illumination when the bias circuit provides a short pulse waveform is shown in FIGURE 2. Typically an output of peak voltage 7 or 8 volts is obtained for a peak bias voltage of 15 volts. FIGURE 3 shows the output waveform when the bias circuit provides a square waveform having the same repetition frequency as the short pulse waveform of FIGURE 2. The circuit of FIGURE 1 has been used successfully with the photodiodes of type numbers 3052, 3152, 3252, 3352, 3452, and 3552.

If the circuit of FIGURE 1 is used with the arrangemeans described in my said co-pending applications, the light source driven at the carrier frequency may be replaced with a source of constant output.

In the embodiment shown in FIG. 4 the first two transistors T1, T2 form a sine wave generator giving an output of 7 volts peak to peak at 35 kc./sec. Frequency selection is by a conventional Wien Bridge network formed by the components C1, C2, R1, R2 and R3. Gain is stabilized by the thermistor TH. The signal from the collector of transistor T2 is rectified by diode D1 and charges the capacitor C5. The steady voltage from the capacitor is fed into the base of one transistor of a long tail pair arrangement. The base of the other transistor of the long tail pair is fed with the signal from the oscillator through resistors R11 and R12.

The efficiency of the rectifying circuit and the ratio of the two resistors R11 and R12 determine the mark space ratio of the part sine wave developed across R10.

The AC signal is amplified by transistors T5 and T6, the output voltage at Y being approximately 17 volts peak to peak with a mark to space ratio of 1:5.

The output from the final collector load R16 is used to bias the photodiode D2 arranged in series with a diode D3. The polarity is such as to cause D2 to close. The presence of light, however, in effect makes D2 leaky in the reverse direction and the top part of the part sine wave is passed by D2 when light is present and the current flows in the forward direction through diode D3 into the 4.7K load.

D2 has a relatively high internal capacity and if D3 were omitted from the circuit considerable breakthrough would occur from the part sine wave carrier, particularly so at low light levels. D3 is a low self-capacity diode and when it is not in the open condition it considerably reduces the magnitude of the breakthrough across the 4.7K load and thereby gives a mark to space ratio of 1:10 at Y.

The numbers shown in FIG. 4 indicate voltage above earth as measured by a micro-ammeter of 100 microamps full scale deflection in series with a 100K resistor.

I claim:

1. Apparatus for producing a modulated carrier wave comprising in combination, a polarizable optical-electrical transducer responsive to incident illumination to produce a varying electrical signal which is a function of the incident illumination, means supplying an oscillating signal wave of appropriate frequency, means supplying a half wave rectified signal of a single polarity from said oscillating signal wave, processing means selecting peaks of the rectified wave signals to produce a modified pulse signal having a mark-to-space ratio of at least one to five, a bias circuit arranged to bias the transducer with the modified pulse signal in a direction such that the pulses prevent the transducer from conducting, a load circuit, a series circuit including the load circuit arranged in series with the bias circuit and said transducer to receive a pulsed waveform from said transducer in the form of pulse carrier signals modulated in accordance with said function of incident light, and a rectifier in said series circuit coupled in a polarity opposite to said transducer to pass pulses in a reverse direction through the transducer.

2. Apparatus as defined in claim 1 in which said frequency is in the order of 30 kcs. and the pulse duration of the modified pulse signal is in the order of three microseconds.

3. Apparatus as defined in claim 1 in which the transducer is a photodiode of the semi-conductor type and the rectifier comprises another diode of low self capacity.

References Cited

UNITED STATES PATENTS

| | | | |
|---|---|---|---|
| 2,212,966 | 8/1940 | Whitacker | 332—3 |
| 2,907,887 | 10/1959 | Beck | 332—3 |
| 3,333,106 | 7/1967 | Fischer | 330—33 |

ROY LAKE, *Primary Examiner.*

L. J. DAHL, *Assistant Examiner.*

U.S. Cl. X.R.

330—33